United States Patent [19]

Kluth et al.

[11] Patent Number: 4,596,725

[45] Date of Patent: Jun. 24, 1986

[54] POLYURETHANE INSULATING FOAM

[75] Inventors: Hermann Kluth; Juergen Wegner; Robert Bachmann, all of Duesseldorf, Fed. Rep. of Germany

[73] Assignee: Henkel Kommanditgesellschaft auf Aktien, Duesseldorf, Fed. Rep. of Germany

[21] Appl. No.: 729,324

[22] Filed: May 1, 1985

[30] Foreign Application Priority Data

May 4, 1984 [EP] European Pat. Off. ........ 84105046.1

[51] Int. Cl.$^4$ .............................................. B05D 3/02
[52] U.S. Cl. .................................. 427/385.5; 427/387; 427/388.1; 427/388.2; 427/389.7; 427/393.5; 427/393.6
[58] Field of Search .................. 427/385.5, 387, 388.1, 427/388.2, 389.7, 393.5

[56] References Cited

U.S. PATENT DOCUMENTS

| | | | |
|---|---|---|---|
| 3,830,760 | 8/1974 | Benngston | 260/2.5 |
| 4,426,487 | 1/1984 | Koenig et al. | 524/710 |
| 4,489,176 | 12/1984 | Kluth et al. | 521/144 |

FOREIGN PATENT DOCUMENTS

| | | |
|---|---|---|
| 2118465 | 4/1971 | Fed. Rep. of Germany . |
| 1137698 | 12/1982 | Canada . |
| 1143612 | 3/1983 | Canada . |
| 8300246 | 3/1984 | European Pat. Off. . |
| 2053943 | 6/1980 | United Kingdom . |

OTHER PUBLICATIONS

Polyurethanes, Chemistry & Tech., Saunders & Frisch, vol. XVI of the High Polymers Series, Interscience Pub., NY–London Part I (1962) Part II (1964).

I. R. Smolka, Nonionic Surfactants, Ed. Martha J. Schick., vol. 2, Marcel Dekker 1967.

B. Kanner, et al., Journal of Cellular Plastics (1979) p. 315.

*Primary Examiner*—Maurice J. Welsh
*Attorney, Agent, or Firm*—Ernest G. Szoke; Henry E. Millson, Jr.; Mark A. Greenfield

[57] ABSTRACT

A method of providing a foam accoustical insulation, thermal insulation, and/or moisture-barrier, in which a polyurethane prepolymer composition is applied to a substrate in situ and then expanded and cured using water pre-applied to the substrate, ambient atmospheric moisture, and/or added atmospheric moisture.

32 Claims, No Drawings

POLYURETHANE INSULATING FOAM

BACKGROUND OF THE INVENTION

1. Field of the Invention

This invention relates to accoustical, thermal, and/or moisture-barrier insulating foam pre-prepared or prepared in situ from single component, moisture-curing, expanding, spreadable polyurethane compositions.

2. Statement of the Prior Art

A wide range of inorganic and organic materials is already available for accoustic and thermal insulation and moisture proofing. They are normally sold and processed as panels, sheets or half-round sections. In addition, polyurethane foams are being used to an increasing extent in this field. Polyurethane foams have the advantage over prefabricated panels, in that the insulating coating may be produced directly on the surface to be insulated and, accordingly, may readily be adapted to the available space. Unfortunately, the polyurethane foams previously used for insulating purposes, where they are two-component products, are uneconomical to use on small surfaces because of the elaborate mixing and spraying machines required. Additionally, two-component products cannot be applied to wet substrates, and may only be applied at certain temperatures. One-component products, on the other hand, have until now been applied solely from aerosol cannisters, which are limited in their size and therefore their output. Furthermore, spraying usually requires time-consuming masking of the areas not being sprayed.

U.S. Pat. No. 4,489,176—Kluth, et al., issued prior to the filing of the present application but claiming a subsequent International Convention priority date, substantially discloses the polyurethane compounds useful in this invention while disclosing utility only as an adhesive, and is incorporated herein by reference.

Polyurethane prepolymers have long been known. They are used for a variety of purposes in industry and are available in many different forms. Thus, it is known that one-component and two-component foams can be formulated on the basis of polyurethanes. Foams such as these are generally available, or may be employed, in aerosol form. Polyurethane foams of this type are described, for example, in U.S. Pat. No. 3,830,760, and corresponding published German patent application No. 20 45 852. The products cure through the diffusion of moisture and are formulated in such a way that they undergo a marked increase in volume after application, which is desirable where they are used as insulating and filling materials. Because of their large-cell, loose structure, foams such as these never attain satisfactory mechanical strength levels and therefore cannot be considered for many applications. In addition, it is difficult to obtain uniform surface application from aerosol application.

It is known from published German patent application No. 21 18 465 that polystyrene foam panels can be bonded to a sheet metal to form a roof covering, by means of an aqueous adhesive emulsion using a mineral fiber board intermediate layer permeable to water vapor. A disadvantage here is the long drying time of the emulsions which is also greatly affected by the air humidity level. Thus, in practice, additional mechanical fastenings such as nails or screws often have to be applied to prevent the insulating boards from being lifted by the effect of wind during the laying and before application of the final sealing layer.

DESCRIPTION OF THE INVENTION

This invention affords insulating materials which overcome all of the above-noted deficiencies of the previously known materials. Thus, this invention provides a one-component polyurethane prepolymer composition, as described below, which may be applied to a substrate to be insulated in the same manner as a lacquer, i.e., by spread-coating, roll-coating, dip-coating, or (if desired) by spray-coating. The coating expands and cures within a few minutes after application, to form an insulating foam. In its expansion, the polyurethane composition employs moisture pre-applied to the substrate or from the ambient atmosphere, as its sole blowing agent.

The described prepolymers may be used in accordance with the invention as a multipurpose spreading foam. In one general embodiment, the polyurethane composition is applied to a dry surface and made to foam by the action of ambient or supplied moisture or sprayed-on water. In another general embodiment of the invention, the spreading foam is applied to a wet substrate so that thicker layers of foam are obtained. The hardened spread foam itself is an excellent substrate for a further layer of foam, so that even thicker foam coatings can be obtained by multiple-layer application.

The spreading foam may also be combined with other materials to form composite materials. Thus, the prepolymer may be applied to textiles, such as woven or nonwoven fabrics, which if desired are wet. Alternatively, nonwoven fabrics may be placed in a layer of foam in the course of hardening. It is also possible to produce laminates with other materials such as plastic sheeting, wallboard, and the like.

The polyurethane compositions used in accordance with this invention have the advantage of adhering firmly to virtually any substrate with the sole known exceptions of fluorinated polymers and siliconized surfaces. For some applications, however, it may be desirable to pretreat the surface. Thus, for application to solid substrates, preliminary coating with an aqueous emulsion-based adhesive may be desirable.

Because of their inherent adhesive properties, the insulating foams of this invention may be self-adhering. The polyurethane polymer foams will adhere to a great variety of substrates, including rigid PVC, polystyrene foams, pre-formed polyurethane foams, textiles, and paper as well as a variety of structural materials including metals, glass, concrete, masonry, stone, ceramic tiles, wood, chipboard, fibreboard, plywood, particle board, plaster, gypsum, drywall, mineral wool, and the like. These materials may not only function as substrates, but may also function as internal or external reinforcements and/or laminates, where appropriate.

Because of the properties of the polyurethane prepolymers utilized, the formation of insulation in situ on a hard substrate is particularly suitable. However, it is also possible to pre-form insulation panels using these same polyurethane prepolymers, which may be used as is, or which may be reinforced or decorated by an internal or external laminar layer of another material. Of course, insulation which is formed in situ may also have internal and/or external reinforcing and/or decorative laminar layers.

The spread foam in accordance with this invention is suitable for thermal and/or accoustic insulation as well as for sound-deadening thin structural components. In addition, it will afford a vapor-barrier and moisture-barrier for porous materials. The in situ form of application facilitates the precision repair of already existing insulation systems and also large-area application to horizontal or vertical sufraces. In this connection, it is of particular value that the products can be stored in the absence of pressure and, therefore, may be packaged in containers of any size or shape, fabricated of any material suitable for its weight and ingredients.

One-component polyurethane compositions have been known for years and are marketed in various forms. They may be divided into three groups, according to their foaming power namely:

non-foaming or low-foaming,
moderately foaming, and
vigorously foaming products.

The non-foaming one-component polyurethane compositions include lacquers. Polyurethane lacquers normally contain additives to prevent bubble formation. Even the removal of additives such as these from polyurethane lacquers does not lead to products useful in the present invention, because the layer of foam applied has very little depth, if any, even on spraying with water. On the other hand, vigorously foaming polyurethanes cannot be used for the purposes of the invention because they contain blowing agents and, hence, have to be stored in aerosol cans or in other pressurized containers.

The only polyurethane which may be used for the purposes of the present invention are low-foaming polyurethanes. Polyurethanes of this type are characterized by the use of a combinaiton of foam stabilizers, of the type also used in one-component polyurethane foams, and low-boiling diluents which are liquid at room temperature under normal conditions.

Accordingly, the present invention utilizes polyurethane compositions which cure in the presence of moisture with an increase in volume, comprising (preferably consisting essentially of): from 60 to 95% by weight of a polyurethane prepolymer containing terminal isocyanate groups, from 0.5 to 8% by weight of foam stabilizers, from 3 to 30% by weight of low-boiling diluents and, if desired, up to 20% by weight of other auxiliaries, all based on the total weight of the composition.

The useful polyurethane preparations according to this invention harden with an increase in volume on contact with moisture and/or water. The polyurethane prepolymers are obtained by reacting a polyhydric alcohol with an excess of a polyfunctional isocyanate.

Suitable polyhydric alcohols contain on average from 2 to more than 4 (preferably 2 to 3) hydroxyl groups and have a hydroxyl (acetyl) number of from about 50 to 250 and, more particularly, from about 80 to 200. Particularly suitable polyhydric alcohols are those having a number-average molecular weight of about 500 to 5,000, preferably 750 to 2,000, particularly about 1,000, among which the reaction products of diols, triols or tetraols with ethylene oxide, propylene oxide or glycidol are preferred. It is possible to use in particular the reaction products of ethylene glycol, propylene glycol, glycerol, trimethylol ethane, trimethylol propane, pentaerythritol or of aminoalcohols, such as triethanolamine or tripropanolamine or 2-amino-2-methylpropane diol, with the above-mentioned epoxides. Other suitable polyhydric alcohols include castor oil or the reaction products of epoxidized fatty acid triglycerides with monohydric alcohols. Reaction products of the above-mentioned diols or triols with caprolactone are also suitable.

Throughout this specification, molecular weight will refer to the number-average molecular weight as measured by end-group determination, unless stated otherwise.

The isocyanates reacted with the polyhydric alcohols to obtain the prepolymers useful in this invention may be aromatic, aliphatic, cycloaliphatic, or any mixture thereof, provided that they are polyfunctional, and having a functionality of about 1.5 to 3.5, preferably about 2 to 3. An example of a suitable cycloaliphatic is isophorone diisocyanate and an example of a suitable aliphatic is hexamethylene diisocyanate. The preferred polyisocyanates for preparing the prepolymers of this invention are aromtic polyisocyanates, and mixtures thereof, having an average functionality about 2 to about 3. Suitable aromatic polyisocyanates include diphenylmethane diisocyanate, p-phenylene diisocyanate, and xylylene diisocyanate. Of these, diphenylmethane diisocyanate is most preferred, particularly in a (technical grade) mixture of isomers having an average functionality of about 2 to about 2.5. It should be noted that aromatic polyisocyanates having a relatively high vapor pressure, such as tolylene diisocyanate, are less suitable for the polymers useful in this invention.

In the prepolymers useful in this invention, the ratio of OH groups to isocyanate groups should be in the range about 1:3-11. A larger number of isocyanate groups than 11 will yield final polymer compositions of too low viscosity. A smaller number of isocyanate groups than 3 (especially 4) will yield final polymer compositions of too high viscosity which are less suitable for in situ insulating applications, because they can only be applied with a trowel.

The relationship of the functionality number of the polyol and/or isocyanate to the crosslinkage density of the polyurethane (and therefore to its hardness and brittleness) is well known in the art. Reference may be made to "Polyurethanes, Chemistry and Technology", Saunders and Frisch, Vol. XVI of the High Polymers Series, Interscience Publishers, New York-London, Part I (1962) and Part II (1964).

The Polyurethane compositions in accordance with this invention also contain foam stabilizers in quantities of from about 0.5 to 8% by weight, preferably in quantities of from about 1 to 4% by weight and, more preferably, in quantities of from about 1 to 2% by weight. Preferred stabilizers are silicone surfactants, which are block copolymers made up of a polysiloxane block and one or more polyoxyethylene and/or polyoxypropylene blocks. Products such as these are commercially available in large numbers. Although nothing definite is known of their function, it may be assumed that, during the curing process of the inventive compositions, these products stabilize the foam bubbles in the still soft foams and hence prevent coalescence and collapse. In one preferred embodiment of the invention, the type and quantity of silicone surfactants used are coordinated in such a way that, during their curing process, the inventive compositions ultimately undergo an increase in volume of about 100–2,500% and preferably about 300–1,000%. This result is achieved, for example, with a quantity of from 0.5 to 5% by weight of "Rhodorsil" Oil 1605, a trademark of Rhone-Poulenc, France. This product is a siloxane-polyether copolymer having a viscosity of approximately 620 cSt at 25° C., a cold setting point of −38° C. and a surface tension at 25° C. of 23.5 mN/m.

Other suitable silicone surfactants are described, for example, in the chapter by I.R. Schmolka in "Nonionic Surfactants", ed. by Martha J. Schick, Vol. 2, pub. by Marcel Dekker, New York (1967). Further reference is made to B. Kanner, et al., Journal of Cellular Plastics (1979), page 315.

Of particular importance in the polyurethane compositions of this invention are the inclusion of diluents or solvents which reduce the composition viscosity and, to a limited extent, may also function as blowing agents. The diluents useful in this invention are only generally apolar, isocyanate-non-reactive, organic solvents which are low boiling, that is, which *must* have boiling points of between about 20° C. and 60° C. and include ethers, alkanes, and/or halogenated hydrocarbons. For applications of the inventive compositions where flammability is a problem, it is important to use non-flammable organic solvents such as halogenated hydrocarbons. For applications of the inventive compositions where flammability is not a problem, other readily volatile hydrocarbon solvents may be used. The diluents may be used individually or in any mixture.

The halogenated hydrocarbon diluents are primarily $C_{1-4}$ (preferably $C_{1-2}$) hydrocarbons in which all or most of the hydrogen atoms are replaced by chlorine or fluorine. Particularly preferred halogenated hydrocarbons are trifluorotrichloroethane (1,1,2-trichlorotrifluoroethane), monofluorotrichloromethane and methylene chloride. Particularly preferred other organic solvents are pentanes, diethylether, and methylisobutylether. Other suitable diluents for use in this invention include:

1,1-dichloroethane,
2,2-dimethylbutane,
2,3-dimethylbutane, and
2,3-dimethyl-1-butene.

The amount of diluent used is limited by its solubility in the inventive compositions, and is generally about 3 to 30% by weight. Where fluorinated hydrocarbons are employed up to 25% by weight, preferably 10 to 20% by weight may be added. Where other hydrocarbons such as pentane are used, 4 to 10% by weight is preferred.

Various types of auxiliary ingredients may be contained in the compositions useful in this invention.

Fillers, pigments and/or thixotropic agents may be added, finely divided inorganic and/or organic pigments being particularly suitable. Preferred auxiliaries are those which build up a three-dimensional structure and, hence, improve the ability of the compositions to remain in place on vertical surfaces and positively affect their spreadability. Auxiliaries of this type are, in particular, pyrogenic silicas, layer-forming silicates such as synthetic and natural bentonites, carbon black, polymer powders or short-staple polymeric fibers, more particularly powders or fibers of polyolefins, polyamides, polyesters, and also inorganic fibers such as glass fibers, rock wool or asbestos. When introducing these auxiliaries into the polyurethane compositions used herein, it is important to ensure that they are at least substantially free from water in order to prevent premature, unintentional foaming and a deterioration in storability. In addition, if it is desired to produce storable products, preliminary tests will be conducted to ensure that the auxiliaries used do not adversely affect storability or performance properties in other respects, conventional stabilizers being added to that end, if necessary.

Additional known auxiliaries which may be included are plasticizers which increase the flame resistance of the polyurethane foams. Standard plasticizers of this type are compounds containing phosphorous and/or halogen atoms, such as tricresyl phosphate, diphenyl cresyl phosphate, tris-2-chloroethyl phosphate, tris-2-chloropropyl phosphate, and tris-2,3-dibromopropyl phosphate. It is also possible to use flameproofing agents, for example chloroparaffins, halogen phosphites, ammonium phosphate and halogen- and phosphorus-containing resins.

The compositions useful in this invention may also contain phosphorus-free plasticizers. Suitable plasticizers of this type are, for example, esters of phthalic acid, such as di-2-ethylhexyl phthalate, diisononyl and diisodecyl phthalate, dibutyl phthalate, diisobutyl phthalate, dicyclohexyl phthalate, dimethyl glycol phthalate, dicapryl phthalate and dioctyl phthalate. Other suitable phosphorus-free plasticizers are diesters of aliphatic dicarboxylic acids, such as di-2-ethylhexyl adipate, diisodecyl adipate and also the corresponding esters of sebacic acid and azelaic acid. Other suitable plasticizers are polyesters of adipic acid, sebacic acid, azelaic acid or phthalic acid with diols, such as butane diol, propane diol or various hexane diols having molecular weights in the range from 850 to 8,000. Finally, the esters of fatty acid cuts with short-chain aliphatic alcohols, such as methanol, ethanol, butanol, isobutanol and isopropanol, are also suitable. Another class of suitable plasticizers are epoxidized fatty acid derivatives, for example epoxidized triglycerides or epoxidized fatty acid methyl, ethyl or propyl ester.

The compositions useful in this invention may also contain accelerators, which are particularly necessary when foaming is to be carried out at or below room temperature. The accelerators normally used for polyurethane foams are suitable, including tertiary bases, such as bis-(N,N-dimethylamino)-diethyl ether, dimethylamino-cyclohexane, N,N-dimethylbenzylamine, N-methylmorpholine and also the reaction products of dialkyl-(β-hydroxyethyl)-amine with monoisocyanates and esterification products of dialkyl-(β-hydroxyethyl)-amine and dicarboxylic acids. Another important accelerator is 1,4-diaminobicyclo-(2.2.2)-octane. Non-basic substances may also be used as accelerators. Non-basic substances suitable for use as accelerators include metal compounds, such as for example iron pentacarbonyl, nickel tetracarbonyl, iron acetyl acetonate and also tin-(II)-(2-ethylhexoate), dibutyl tin dilaurate or molybdenum glycolate.

EXAMPLES 1 to 3 and C-1

Polyurethane prepolymers intended for use as insulating foams were prepared from:

| | |
|---|---|
| 44.4 | parts by weight of diphenylmethane diisocyanate, |
| 35.6 | parts by weight of a polyol mixture and auxiliary ingredients, and |
| 20.0 | parts by weight of low-boiling diluent. |
| 100.0 | |

A mixture of the following constituents was used as the polyol mixture and auxiliary ingredients:

| | |
|---|---|
| 54.0% | by weight of polyether triol (reaction product of triethanolamine with 17 mols of propylene oxide), |
| 14.0% | by weight of polyether diol based on ethylene oxide (molecular weight approx. 1,000), |
| 28.0% | by weight of diphenyl cresyl phosphate, and |
| 4.0% | by weight of silicone surfactant ("Rhodorsil" Oil 1605). |
| 100.0 | |

The following low-boiling solvents were used:
trichlorotrifluoroethane (Example 1),
trichlorofluoromethane (Example 2),
n-pentane (Example 3), and
toluene (Comparison Example C-1).

To produce coatings of insulating foam, the prepolymer solutions according to Examples 1 to 3 and Comparison Example C-1 were knife-coated onto air-dry and moistened blockboards in layer thicknesses of 0.2 and 0.5 mm. The layers of foam thus applied were hardened at 23° C./50% relative air humidity, to demonstrate the favorable effect of low-humidity. To demonstrate the favorable effect of the low-boiling diluents used in the polymers in accordance with the invention, the layer thickness of the hardened insulating foams was determined after storage for 24 hours. The results are shown in Table I.

TABLE I

| | Thickness of hardened foam layer (mm) | | | |
|---|---|---|---|---|
| | 0.2 mm application | | 0.5 mm application | |
| Example | moistened | air-dry | moistened | air-dry |
| 1 | 0.60 | 0.65 | 5.15 | 4.65 |
| 2 | 1.10 | 0.90 | 5.65 | 5.00 |
| 3 | 0.60 | 0.55 | 4.20 | 2.80 |
| C-1 | 0.30 | 0.35 | 2.85 | 1.35 |

As is known in the insulating art, the thermal resistance ("R") value and the accoustical insulating effectiveness, for any given foam material, is a direct function of that foams' thickness. The moisture-barrier effectiveness of a foam is also, although to a lesser extent, a function of its thickness, assuming of course that the foam is closed cell and non-porous. The thickness of the foam layer that forms is therefore a measure of the effectiveness of the insulating and moisture-barrier qualities of the polyurethane foams used according to this invention.

Thus, Table I demonstrates that only polyurethane prepolymer compositions as specified herein are useful, and that a closely related composition differing only as to its diluent (Example C-1) is not useful because its produced foam is not thick enough.

EXAMPLES 4 to 8 and C-2 to C-4

Polyurethane prepolymer compositions of the ingredients and parts by weight set forth in Table II were mixed at room temperature. A slight increase in temperature to about 60° C. occurred. The polyurethane prepolymer compositions were then stored for 48 hours and applied to a glass plate in a 1.5 mm thick layer, by means of a doctor blade. The results are given in Table III. Layer thickness was measured after a curing time of 2 hours. It may be noted that Comparison Example C-2 omitted the foam stabilizer and that Comparison Examples C-3 and C-4 omitted the diluent. From the unsatisfactory results of Comparison Examples C-2 to C-4, one may conclude that the foam stabilizer is critical and that the diluent is critical independent of the other ingredients, including the presence or absence of the foam stabilizer (Example C-3). All of the comparison examples took a long time to set (3 to 8 hours) and demonstrated very little or no foaming and therefore little or none of the required foam expansion. Thus, one may conclude that all of the useful foams according to this invention showed superior accoustical and thermal insulating and moisture-barrier properties to all of the comparison foams.

TABLE II

| | | EXAMPLES (parts by weight) | | | | | | | |
|---|---|---|---|---|---|---|---|---|---|
| | INGREDIENT | according to this invention | | | | | comparison | | |
| Function | Identification | 4 | 5 | 6 | 7 | 8 | C-2 | C-3 | C-4 |
| PREPOLYMER | 1. diphenylmethane diisocyanate (technical isomer mixture) | 100.0 | 100.0 | 120.0 | 120.0 | 120.0 | 120.0 | 120.0 | 120.0 |
| | 2. polyhydric polyether triol[a] | 56.0 | 56.0 | 58.0 | 58.0 | 56.0 | 60.0 | 56.0 | 60.0 |
| | alcohol polyether diol[b] | 10.0 | 10.0 | 10.0 | 10.0 | 10.0 | 10.0 | 10.0 | 10.0 |
| FOAM STABILIZER | silicone surfactant[c] | 4.0 | 4.0 | 2.0 | 2.0 | 4.0 | — | 4.0 | — |
| DILUENT | trifluorotrichloroethane | 50.0 | — | 15.0 | 20.0 | — | 50.0 | — | — |
| | monofluorotrichloromethane | — | 50.0 | 15.0 | — | — | — | — | — |
| | methylene chloride | — | — | — | 10.0 | — | — | — | — |
| | n-pentane | — | — | — | — | 10.0 | — | — | — |
| AUXILIARY (flame resistance) | tris-chloropropyl phosphate | 30.0 | 30.0 | 30.0 | 30.0 | 30.0 | 30.0 | 30.0 | 30.0 |

Notes:
[a] triethanolamine-propylene oxide adduct, molecular weight approximately 1,000.
[b] polypropylene glycol, molecular weight approximately 1,000
[c] "RHODORSIL" Oil 1605

TABLE III

| | EXAMPLES (parts by weight) | | | | | | | |
|---|---|---|---|---|---|---|---|---|
| | according to this invention | | | | | comparison | | |
| EVALUATION | 4 | 5 | 6 | 7 | 8 | C-2 | C-3 | C-4 |
| Setting Time (hours) | <2 | <2 | <2 | <2 | <2 | >3 | >3 | >3 |
| Foam height of a 1.5 mm applied layer (approx., in mm) | 7 | 14 | 9 | 6 | 12 | no foam | very little foam | no foam |

TABLE III-continued

| EVALUATION | EXAMPLES (parts by weight) | | | | | | |
|---|---|---|---|---|---|---|---|
| | according to this invention | | | | comparison | | |
| | 4 | 5 | 6 | 7 | 8 | C-2 | C-3 | C-4 |
| Observation of foam structure after hardening | # | # | # | @ | # | no foam | | no foam |

Notes:
\# fine-cell, uniform foam structure - very desirable for insulation
@ less uniform foam structure - acceptable for insulation
  extremely large cells and irregular foam structure - porous and undesirable for insulation

We claim:

1. A method of providing a foam accoustical insulation, thermal insulation, and/or moisture barrier for a substrate, comprising applying thereto, in situ, a polyurethane prepolymer composition in the presence of ambient or added atmospheric moisture and/or water coating the surface of said substrate; said polyurethane prepolymer composition being applied in an amount effective to provide said foam upon its interaction with said moisture and/or water and consequent expansion; and said polyurethane prepolymer composition comprising
    (A) a polyurethane prepolymer containing terminal isocyanate groups which is the reaction product of a polyhydric alcohol with a stoichiometric excess of a polyfunctional isocyanate, present in about 60 to 95%;
    (B) a polysiloxane copolymer foam stabilizer, present in about 0.5 to 8% by weight;
    (C) at least one isocyanate-non-reactive organic diluent having a boiling point of about 20° C. to not more than 60° C., present in about 3 to 30%; and
    (D) at least one auxiliary which is a filler, pigment, plasticizer, or accelerator, which may be present in up to about 20%;
all percentages being by weight based upon the total weight of the prepolymer composition.

2. The method of claim 1 wherein
    (A) said polyurethane prepolymer containing terminal isocyanate groups is the reaction product of
        (a) at least one polyhydric alcohol having a hydroxyl number of about 50 to 250 and a number-average molecular weight of about 500 to 5,000; and
        (b) at least one polyfunctional isocyanate which is aromatic, aliphatic, or cycloaliphatic, and which has a functionality of about 1.5 to 3.5, wherein the ratio of hydroxyl groups to isocyanate groups is in the range 1:3–11; and
    (B) said at least one foam stabilizer is a block copolymer of at least one polysiloxane block and at least one polyoxyalkylene block.

3. The method of claim 2 wherein said at least one polyhydric alcohol is the reaction product of a diol, triol, or tetraol with ethylene oxide, propylene oxide or glycidol, or any mixture thereof.

4. The method of claim 3 wherein said at least one polyhydric alcohol is the reaction product of a diol and triol and has a hydroxyl number of about 80 to 200.

5. The method of claim 4 wherein said at least one polyhydric alcohol has a number-average molecular weight of about 750 to 2,000.

6. The method of claim 2 wherein said polyhydric alcohol is a triethanolamine-propylene oxide adduct, a propylene glycol, a polyether diol based on ethylene oxide having a molecular weight of about 1,000, or any mixture thereof.

7. The method of claim 2 wherein said polyfunctional isocyanate is an aromatic isocyanate having a functionality of about 2 to 3.

8. The method of claim 7 wherein said polyfunctional isocyanate is diphenylmethane diisocyanate, p-phenylene diisocyanate, xylylene diisocyanate, or a mixture thereof.

9. The method of claim 8 wherein said polyfunctional isocyanate is a mixture of diphenylmethane diisocyanate isomers having an average functionality of about 2 to 2.5.

10. The method of claim 6 wherein said polyfunctional isocyanate is a mixture of diphenylmethane diisocyanate isomers having an average functionality of about 2 to 2.5.

11. The method of claim 2 wherein said polyfunctional isocyanate is an isophorone diisocyanate, a hexamethylene diisocyanate, or a mixture thereof.

12. The method of claim 2 wherein said foam stabilizer is present in about 1% to 4%.

13. The method of claim 12 wherein said foam stabilizer is present in about 1% to 2%.

14. The method of claim 1 wherein said polyurethane prepolymer composition reacts with said moisture and/or water such that the foam produced has a volume increased about 100 to 2,500% over the volume of the applied prepolymer composition.

15. The method of claim 14 wherein the volume increase is about 300 to 1,000%.

16. The method of claim 1 wherein said at least one diluent is a hydrocarbon solvent.

17. The method of claim 1 wherein said at least one diluent is a non-flammable halogenated hydrocarbon solvent.

18. The method of claim 1 wherein said at least one diluent is a $C_{1-4}$ hydrocarbon in which at least most of the hydrogen atoms are replaced by fluorine and which is present in up to 25% by weight.

19. The method of claim 1 wherein said at least one diluent is trifluorotrichloroethane, monofluorotrichloromethane, methylene chloride, pentane, diethyl ether, or a mixture thereof.

20. The method of claim 16 wherein said diluent is present in about 4% to 10%.

21. The method of claim 17 wherein said diluent is present in about 10% to 20%.

22. The method of claim 10 wherein said diluent is trifluorotrichloroethane, monofluorotrichloromethane, methylene chloride, or a mixture thereof, and is present in about 10% to 20%.

23. The method of claim 10 wherein said diluent is pentane, diethyl ether, methylisobutyl ether, or a mixture thereof, and is present in about 4% to 10%.

24. The method of claim 1 wherein at least one said auxiliary is present.

25. The method of claim 24 wherein (a) said fillers and/or pigments are: pyrogenic silicas; layer-forming silicates including synthetic and natural bentonites; carbon black; powders or fibers of polyolefins, polyamides, polyesters; glass fibers; rock wool; or asbestos;
(b) said plasticizers are: compounds containing phosphorous and/or halogen atoms capable of increasing flame resistance; or phosphorus-free plasticizers; and
(c) said accelerators are: tertiary bases; or metalo-organic compounds.

26. The method of claim 1 wherein said substrate is paper, textile, wood, chipboard, fibreboard, particle board, plywood, plaster, gypsum, drywall, concrete, masonry, stone, ceramic tile, glass, metal, plastic, or any combination thereof.

27. The method of claim 26 wherein said substrate is substantially porous and is wetted prior to the application of said prepolymer composition.

28. The method of claim 26 wherein said substrate is substantially nonporous and moisture for expansion and curing of said foam is afforded from said ambient air or from added atmospheric moisture.

29. The method of claim 1 wherein the application of said prepolymer composition is repeated after the initial application has expanded to a foam and hardened, so that a plurality of insulating and/or moisture barrier layers is formed.

30. The method of claim 1 wherein said substrate is treated with an aqueous emulsion-based adhesive prior to the application of said polyurethane prepolymer composition.

31. The method of claim 26 wherein said substrate is treated with an aqueous emulsion-based adhesive prior to the application of said polyurethane prepolymer composition.

32. The method of claim 29 wherein said substrate is treated with an aqueous emulsion-based adhesive prior to the application of said polyurethane prepolymer composition.

* * * * *